H. SCHNEIDER.
PLOW.
APPLICATION FILED OCT. 28, 1913.
1,217,839.
Patented Feb. 27, 1917.
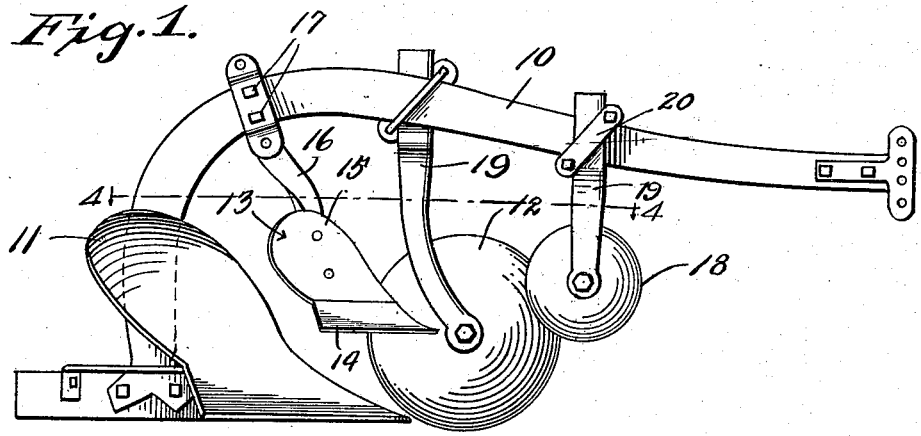
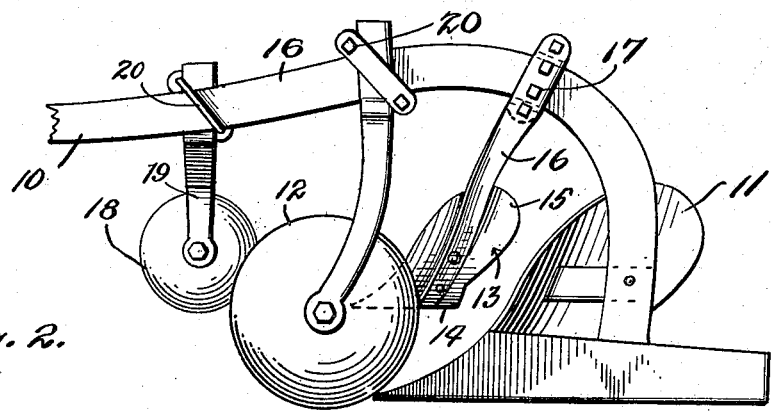
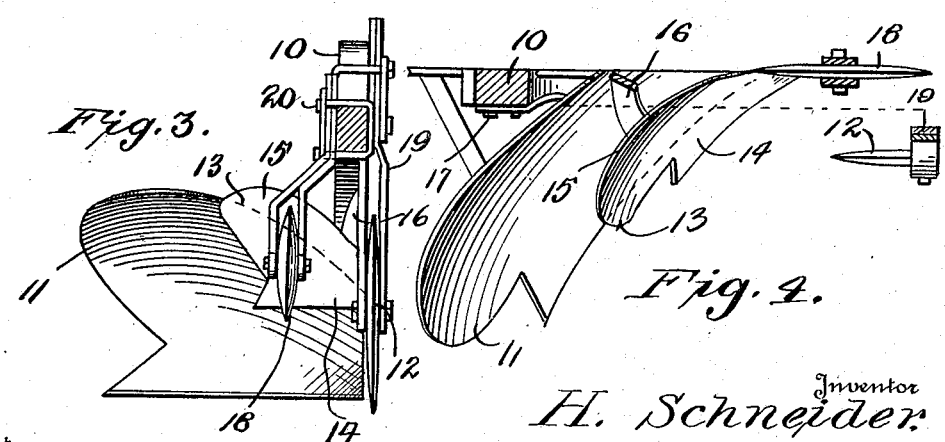
Inventor
H. Schneider.

UNITED STATES PATENT OFFICE.

HENRY SCHNEIDER, OF ALDEN, MINNESOTA.

PLOW.

1,217,839.     Specification of Letters Patent.     Patented Feb. 27, 1917.

Application filed October 28, 1913. Serial No. 797,880.

*To all whom it may concern:*

Be it known that I, HENRY SCHNEIDER, a citizen of the United States, residing at Alden, in the county of Freeborn, State of Minnesota, have invented certain new and useful Improvements in Plows; and I do hereby declare the following to be a full, clear, and exact description of the invention, such as will enable others skilled in the art to which it appertains to make and use the same.

This invention relates to plows and has for an object to provide a small plow in advance of the large plow, the small plow serving to turn a shallow depth furrow which will be subsequently turned under by the large plow so that the quack grass and other weeds will be killed while a good seed bed on the surface of the soil is promoted.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—

Figure 1 is a side elevation showing a plow equipped with my improvements.

Fig. 2 is a side elevation showing the opposite side of the plow from that shown in Fig. 1.

Fig. 3 is a front elevation of the device.

Fig. 4 is a horizontal sectional view on the line 4—4 Fig. 1.

Referring now to the drawing in which like characters of reference designate similar parts, 10 designates a beam, 11 the plow, and 12 the colter, these parts being of the usual and well known plow construction.

In carrying out my invention I provide a small plow 13 constructed similar to the large plow, that is it includes a share 14 and a mold board 15, the mold board carrying a standard 16 which is attached at the upper end to one side of the plow beam by means of bolts 17 or otherwise. The small plow is suspended by its hanger above the share of the large plow and directly in advance of the large plow, the land side of the small plow coinciding with the land side of the large plow. A colter 18 is carried on a standard 19 which is attached to the same side of the beam as the small plow by means of bolts 20 or otherwise. This colter serves to open a cut for the small plow.

In operation the small plow will turn over a shallow furrow into the path of the large plow, such shallow furrow being of about six inches more or less in width and of about three to five inches more or less in depth. The quack grass and weeds on the surface of the soil are thus turned over, and upon advance of the large plow this quack grass will be turned under by the large plow whereby the quack grass and weeds are buried on the bottom of the furrow turned by the large plow and are thus killed, while at the same time a good seed bed on the surface of the soil is promoted.

From the above description it will be seen that I have provided an extremely simple and inexpensive attachment for plows, which attachment will effectively kill quack grass and other weeds and which may be made at a minimum cost and will be formed of a few simple parts that will not easily get out of order.

What is claimed, is:—

In a quack grass destroyer, the combination with a plow having the usual forwardly projecting draft beam, of a colter secured to said beam in advance of said plow alined with the vertical cutting edge thereof and of a depth equal to that of said plow, a relatively small plow depending from said beam in the rear of said colter and having its land side engaged by the colter, the lower edge of the small plow terminating at a point midway the lower and upper edges of the colter, a second colter depending from said beam in advance of the first named colter being offset from the beam and being alined with the outer portion of the mold board of the said small plow, and the lower edge of the said second colter being disposed in the same horizontal plane with the bottom edge of the small plow, substantially as described.

In testimony whereof, I affix my signature, in the presence of two witnesses.

HENRY SCHNEIDER.

Witnesses:
NORMAN E. PETERSON,
M. M. JONES.

Copies of this patent may be obtained for five cents each, by addressing the "Commissioner of Patents, Washington, D. C."